United States Patent [19]
Fanning

[11] Patent Number: 5,552,058
[45] Date of Patent: Sep. 3, 1996

[54] COOLING TOWER WATER TREATMENT METHOD

[75] Inventor: Chris E. Fanning, Oklahoma City, Okla.

[73] Assignee: Advanced Waste Reduction, Tulsa, Okla.

[21] Appl. No.: 230,573

[22] Filed: Apr. 21, 1994

Related U.S. Application Data

[63] Continuation-in-part of Ser. No. 117,265, Sep. 3, 1993, abandoned.

[51] Int. Cl.$^6$ .................................................. C02F 9/00
[52] U.S. Cl. ........................ 210/669; 210/688; 210/805; 210/806
[58] Field of Search ................................ 210/668, 669, 210/688, 805–807, 167, 195.1, 259, 266, 314, 510.1

[56] References Cited

U.S. PATENT DOCUMENTS

| | | | |
|---|---|---|---|
| 2,297,817 | 10/1942 | Truxell et al. | 210/510.1 |
| 3,890,254 | 6/1975 | Guthrie | 260/2.5 BD |
| 3,902,102 | 8/1975 | Burn | 317/258 |
| 4,145,281 | 3/1979 | Weishaar et al. | 210/688 |
| 4,306,967 | 12/1981 | Trautwein | 210/167 |
| 4,517,069 | 5/1985 | Harney | 204/290 F |
| 4,642,192 | 2/1987 | Heskett | 210/638 |
| 4,687,553 | 8/1987 | Solomon | 204/16 |
| 4,830,761 | 5/1989 | Leach et al. | 210/195.1 |
| 4,975,230 | 12/1990 | Pinkhasov | 264/59 |
| 5,013,415 | 5/1991 | Hudson | 204/152 |
| 5,122,274 | 6/1992 | Heskett | 210/638 |
| 5,135,654 | 8/1992 | Heskett | 210/638 |
| 5,145,585 | 9/1992 | Coke | 210/167 |
| 5,151,222 | 9/1992 | Ruffoni | 252/511 |
| 5,185,381 | 2/1993 | Ruffoni | 521/52 |

OTHER PUBLICATIONS

Photocopy, Fluid Treatment, Inc. Brochure.
Photocopy, Astromet, Inc. Brochure.
Photocopy, Filtering Media By Matt–Son, Matt–Son, Inc., Mar. 1, 1990.

*Primary Examiner*—Ivars Cintins
*Attorney, Agent, or Firm*—Dunlap & Codding, P.C.

[57] ABSTRACT

A filtering method for removing particulate matter and dissolved heavy metals from cooling tower water by passing the cooling tower water through a filter assembly containing a particulate matter filter and a heavy metals filter having a filter element having metal particles bound together in a porous metal sponge-like structure.

29 Claims, 1 Drawing Sheet

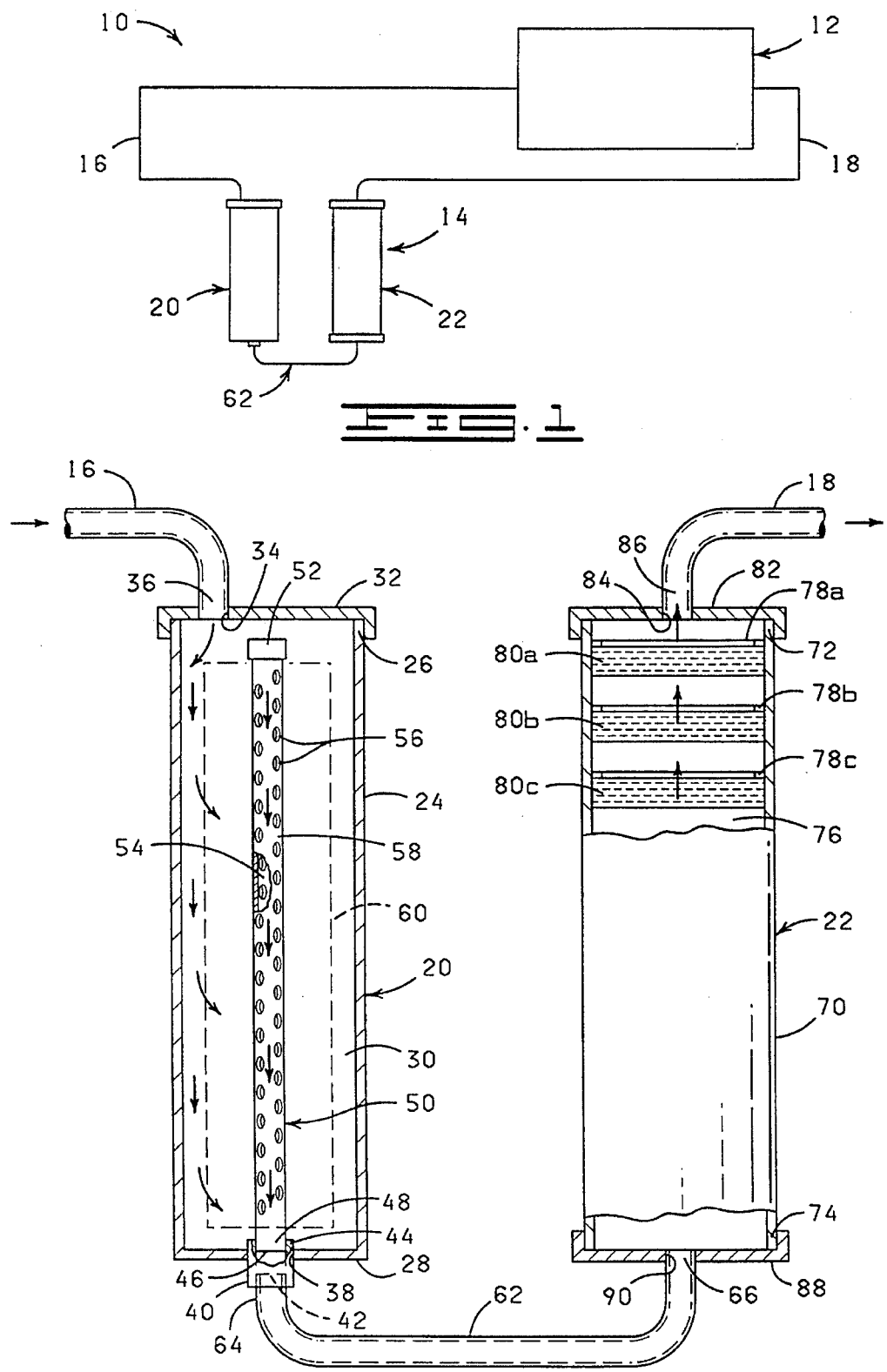

COOLING TOWER WATER TREATMENT METHOD

RELATED APPLICATIONS

This application is a continuation-in-part of co-pending U.S. Ser. No. 08/117/265 filed Sep. 3, 1993 entitled: "FILTERING METHOD WHERE FLUID OR GAS IS PASSED THROUGH FILTER ELEMENT OF METAL PARTICLES INTERCONNECTED IN SPONGE-LIKE FORM", now abandoned.

FIELD OF THE INVENTION

The present invention relates generally to water treatment systems and, more particularly, but not by way of limitation, to a method for treating cooling tower water without chemical additives.

BRIEF DESCRIPTION OF THE DRAWINGS

FIG. 1 is diagrammatic view of a cooling tower water treatment system constructed in accordance with the present invention.

FIG. 2 is a cross sectional view of a filter system of the cooling tower water treatment system of FIG. 1.

DESCRIPTION OF THE PREFERRED EMBODIMENTS

The treatment of cooling tower water to retard scale formation and corrosion in a cooling tower, as well as to eliminate biological fouling and toxic contaminants in the cooling tower water has, in the past, required the use of chemical additives. In addition, in order to maintain the cooling tower water at a neutral pH, i.e. a pH of 7, the pH of the water has had to be continuously monitored and chemical additives introduced into the cooling tower water to maintain the cooling tower water at a neutral pH. Many of the chemical additives heretofore employed in the treatment of cooling tower water are environmentally undesirable and many times such additives have proven to be ineffective.

Shown in FIG. 1 is a cooling tower water treatment system 10 constructed in accordance with the present invention. As will be described in more detail hereinafter, the cooling tower water treatment system 10 effectively eliminates scale formation and corrosion in a cooling tower 12, eliminates biological fouling of the cooling tower water and removes or substantially reduces the amount of particulate matter and dissolved heavy metals present in the cooling tower water, while at the same time automatically adjusting the pH of the cooling tower water to a neutral pH, all without the use of chemical additives.

The cooling tower water treatment system 10 includes a filter assembly 14 through which cooling tower water is circulated. The cooling tower water is passed from the cooling tower 12 into the filter assembly 14 via a conduit 16. The cooling tower water is then circulated through the filter assembly 14 wherein particulate matter and dissolved heavy metals are removed from the cooling tower water. In addition, the pH of the cooling tower water is adjusted to a neutral pH in the filter assembly 14. The treated cooling tower water is then passed from the filter assembly 14 via conduit 18 and recirculated through the cooling tower 12.

More specifically, in the operation of the cooling tower water treatment system 10 of the present invention, cooling tower water from the cooling tower 12 is introduced into the filter assembly 14 and passed through a particulate filter 20 to produce a first filtrate substantially free of particulate matter. The first filtrate is then passed through one or more heavy metals filters 22 to produce a second filtrate substantially free of particulate matter and dissolved heavy metals. The second filtrate (i.e., treated cooling tower water), which is recirculated to the cooling tower 12 via conduit 18, has a substantially neutral pH and bacterial growth in the cooling tower water is substantially eliminated by passage of the cooling tower water through the filter assembly 14. While only one heavy metals filter 22 has been shown in the drawings, it should be understood that a plurality of heavy metal filters can be connected in parallel if such is required to handle the volume of cooling tower water to be treated by the cooling water treatment system 10 of the present invention.

As more clearly shown in FIG. 2, the particle filter 22 includes a filter case 24. The filter case 24 preferably is constructed of a plastic material or a metal with a plastic lining. In one form, the filter case 24 is a cylindrically shaped member having an open upper end 26, a closed lower end 28 and a filter cartridge chamber 30 extending therebetween.

An end cap 32 is disposed over and connected to the upper end 26 of the filter case 24. A cap opening 34 is formed through the end cap 32 so that the filter chamber 30 of the filter case 24 is in open fluid communication with the cap opening 34. One end 36 of the conduit 16 is disposed within the cap opening 34 and secured to the end cap 32 so that fluid communication is provided between the cooling tower 12 and the filter cartridge chamber 30 of the filter case 24 via the conduit 16 and the cap opening 34 in the end cap 32.

The closed lower end 28 of the filter case 24 is provided with a centrally disposed opening 38 having a collar 40 disposed therein. The collar 40, which is connected to the closed lower end 28 of the filter case 24 so that a fluid-tight seal is formed therebetween, is provided with a first end portion 42, a second end portion 44 and a fluid flow passageway 46 extending therebetween. The collar 40 is disposed within the opening 38 in the closed lower end 28 of the filter case 24 so that the first end portion 42 of the collar 40 extends outwardly from the closed lower end 28 of the filter case 24 and the second end portion 44 of the collar 40 extends inwardly into the filter cartridge chamber 30 of the filter case 24 substantially as shown. A lower end 48 of a filter cartridge stabilizing tube 50 is disposed within the second end portion 44 of the collar 40.

The filter cartridge stabilizing tube 50 is concentrically disposed within the filter cartridge chamber 30 of the filter case 24; and the filter cartridge stabilizing tube 50 has a length less than the length of the filter case 24.

The filter cartridge stabilizing tube 50 is further characterized as having a closed upper end 52, a fluid flow passageway 54 extending between the lower and upper ends 48 and 52, respectively, and a plurality of spatially disposed apertures 56 formed through a sidewall 58 of the filter cartridge stabilizing tube 50 so as to provide fluid communication between the filter cartridge chamber 30 and the fluid flow passageway 54 of the filter cartridge stabilizing tube 50.

The particle filter 20 further includes a filter cartridge 60 (shown by phantom lines in FIG. 2). The filter cartridge 60 has a central passageway (not shown) extending therethrough so that the filter cartridge 60 can be disposed on the filter cartridge stabilizing tube 50 and thereby stabilized within the filter cartridge chamber 30 of the filter case 24 substantially as shown.

Any commercially available filter cartridge capable of filtering particulate matter from cooling tower water and which can be positioned on the filter cartridge stabilizer tube 50 so as to be supported within the filter cartridge chamber 30 of the filter case 24 can be employed as the filter cartridge 60. Desirably, the filter cartridge will have a pore size of from about 0.5 to about 40 microns. An example of a commercially available filter which can be employed as the filter cartridge 60 is a polypropylene particle filter having a pore size of about 5 microns manufactured by MATT-SON, Inc. of Barrington, Ill.

The filter assembly 14 further includes a conduit 62 for connecting the particulate filter 20 to the heavy metals filter 22 and thus provide fluid communication between the particulate filter 20 and the heavy metals filter 22. One end 64 of the conduit 62 is disposed within and connected to the first end portion 42 of the collar 40 so that a fluid-tight seal is formed there between and fluid communication is provided between the filter cartridge chamber 30 of the filter case 24 and the conduit 64 via the apertures 56 formed through the sidewall 58 and the fluid flow passageway 54 of the filter cartridge stabilizing tube 50 and the fluid flow passageway 46 of the collar 40. A second end portion 66 of the conduit 62 is connected to the heavy metals filter 22 in a manner which will be herein after described so that the heavy metals filter 22 is in fluidic communication with the particulate filter 20.

The heavy metals filter 26, which is positioned downstream of the particle filter 24 and connected in series with the particle filter 24, includes a filter case 70. The filter case 70 preferably is constructed of a plastic material or a metal with a plastic lining. In one form, the filter case 70 is a cylindrically shaped member having an upper end 72, a lower end 74 and a filter chamber 76 extending therebetween.

A plurality of spatially disposed ring-like retaining members 78 are secured to the filter case 70 and disposed in the filter chamber 76. Three ring-like retaining members 78 are shown in FIG. 2 and designated therein by the individual reference numerals 78a, 78b and 78c.

The heavy metals filter 22 further includes a plurality of filter elements 80. Each of the filter elements 80 is maintained in a desired position in the filter chamber 76 of the filter case 70 by one of the ring-like retaining members 78. Three filter elements 80 are shown in FIG. 2 and designated by the individual reference numerals 80a, 80b and 80c, respectively. More particularly, the filter element 80a is maintained in a predetermined position in the filter chamber 76 of the filter case 70 by the ring-like retaining member 78a, the filter element 80b is maintained in a predetermined position in the filter chamber 76 of the filter case 70 by the ring-like retaining member 78b and the filter element 80c is maintained in a predetermined position in the filter chamber 76 of the filter case 70 by the ring-like retaining member 78c.

A first end cap 82 is disposed over and connected to the filter case 70 of the heavy metals filter 22 generally adjacent the upper end 72 of the filter case 70. A cap opening 84 is formed through the first end cap 82. The cap opening 84 is in fluidic communication with the filter chamber 76 of the filter case 70. One end 86 of the conduit 18 is secured to the first end cap 82 so that a fluid-tight seal is formed therebetween and fluid communication is provided between the filter chamber 76 of the filter case 70 and the conduit 18 via the cap opening 84 formed through the first end cap 82.

A second end cap 88 is disposed over the lower end 74 of the filter case 78 of the heavy metals filter 22 and secured to the filter case 78. The second end cap 88 closes the lower end 74 of the filter case 70. The second end cap 88 has a cap opening 90 formed therethrough in fluidic communication with the filter chamber 76 of the filter case 78. The second end portion 66 of the conduit 62 is secured to the second end cap 88 so that a fluid-tight seal is formed therebetween and fluid communication is provided between the filter cartridge chamber 30 of the particulate filter 20 and the filter chamber 76 of the heavy metals filter 22.

The number of filter elements 80 and cooperating ring-like retaining members 78 in the filter chamber 76 of the filter case 70 can vary and will generally depend upon the amount of heavy metals and other contaminants in the cooling tower water to be treated, the degree with which such heavy metals and other contaminants are to be removed from the cooling tower water and the treatment rate (i.e. the desired rate of flow of the cooling tower water through the filter elements 80), and the degree of pH control and bacterial growth control desired in the cooling tower water.

The filter elements 80 each are identical in construction and operation although it should be noted that the design parameters of each filter element 80 may vary if desired.

Each filter element 80 comprises metal particles bound together in an interconnected form of a porous metal, sponge-like structure. The metal particles are selected from a group of particles comprising zinc and copper, or zinc, or copper, or combinations thereof. The metal particles preferably are of the type described in U.S. Pat. No. 5,135,654, titled "Method For Treating Fluids" issued to Heskett, Aug. 4, 1992, and U.S. Pat. No. 4,642,192 titled "Method Of Treating Fluids" issued to Heskett, Feb. 10, 1987, and U.S. Pat. No. 5,122,274, titled "Method of Treating Fluids" issued to Heskett, Jun. 16, 1992 and the disclosure of each of these three patents specifically hereby are incorporated herein by reference.

The metal particles described before are commercially available from Fluid Treatment, Inc. of Constantine, Mich. and sold under the mark KDF. More particularly, particles sold by this company and identified by the mark KDF-55 have been found useful in forming the filter elements 80 of the heavy metals filter 22.

The commercially available metal particles described before are in a powder-like form. To form the sponge-like structure contemplated by the present invention, the particles are mixed with a carrier and applied to a foam structure. The foam structure then is subjected to heat and pressure to form the sponge-like structure. The method for forming sponge-like structures of metal or ceramics is well known in the art and commercially available through companies such as Astromet, Inc. of Cincinnati, Ohio.

The various parameters of the sponge-like filter elements 80 such as pore size and density may vary widely. Preferably, the pore size of the filter elements 80 is in a range from about 10 microns to about ¼ of an inch.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for treating cooling tower water containing particulate matter and dissolved heavy metals to effectively eliminate fouling of cooling tower water and substantially remove particulate matter and dissolved heavy metals in the cooling tower water while automatically adjusting the pH of the cooling tower water to a substantially neutral pH and eliminating bacterial and algae growth in the cooling tower water without the addition of chemical additives to the cooling tower water, the method comprising:

provides passing the cooling tower water through a particle filter to produce a filtrate substantially free of particulate matter; and passing the filtrate through a porous metal sponge-like structure formed of metal particles bound together in an interconnected form to substantially remove dissolved heavy metals from the filtrate and provide treated cooling tower water substantially free of algae and bacterial growth and wherein the pH of the treated cooling tower water is automatically adjusted to a substantially neutral pH by passage of the filtrate through the porous metal sponge-like structure.

2. A method for continuously treating cooling tower water to prevent scale formation and corrosion in a cooling tower while providing the cooling tower water with a substantially neutral pH and substantially eliminating bacterial and algae growth in the cooling tower water without addition of chemical additives, the method comprising:

passing the cooling tower water through a particle filter having a pore size of from about 0.5 to about 40 microns to remove particulate matter from the cooling tower water and thereby provide a filtrate substantially free of particulate matter; and passing the filtrate substantially free of particulate matter through a porous metal sponge-like structure formed of metal particles bound together in an interconnected form to produce treated cooling tower water having a substantially neutral pH which is substantially free of particulate and dissolved heavy metal contaminants and resistant to bacterial and algae growth without addition of chemical additives to the treated cooling tower water.

3. The method of claim 2 wherein the particle filter is a polypropylene particle filter.

4. The method of claim 3 wherein the polypropylene particle filter has an average pore size of from about 5 to about 40 microns.

5. The method of claim 4 wherein the metal particles forming the porous metal sponge-like structure through which the filtrate is passed to remove dissolved heavy metals in the filtrate, while automatically providing the treated cooling tower water with a substantially neutral pH and while substantially eliminating bacterial and algae growth in the treated cooling tower water without addition of chemical additives are selected from the group consisting of zinc, copper and combinations thereof.

6. The method of claim 1 wherein the metal particles forming the porous metal sponge-like structure through which the filtrate is passed to remove dissolved heavy metals in the filtrate, while automatically providing the treated cooling tower water with a substantially neutral pH and while substantially eliminating bacterial and algae growth in the treated cooling tower water without addition of chemical additives are selected from the group consisting of zinc, copper and combinations thereof.

7. A method for treating cooling tower water to remove contaminants therefrom to effectively eliminate fouling of cooling tower water while automatically adjusting the pH of the cooling tower water to a substantially neutral pH and eliminating bacterial and algae growth in the cooling tower water without addition of chemical additives, the method, comprising:

providing a particle filter capable of removing particulate matter from the cooling tower water;

passing the cooling tower water through the particle filter to produce a substantially particulate-free filtrate;

providing a porous metal sponge-like structure formed of metal particles bound together in an interconnected form of the porous metal sponge-like structure; and passing the substantially particulate-free filtrate through the porous sponge-like structure to substantially remove dissolved heavy metals from the substantially particulate-free filtrate and provide treated cooling tower water substantially free of particulate matter and dissolved heavy metals and wherein the pH of the treated cooling tower water is automatically adjusted to a substantially neutral pH by passage of the substantially particulate-free filtrate through the porous metal sponge-like structure.

8. The method of claim 7 wherein, in the step of providing the particle filter, the particle filter is a polypropylene particle filter.

9. The method of claim 7 wherein, in the step of providing the particle filter, the particle filter is a polypropylene particle filter having an average pore size of from about 5 to about 40 microns.

10. The method of claim 9 wherein, in the step of providing the porous metal sponge-like structure formed of metal particles bound together in an interconnected form, the metal particles are selected from the group consisting of zinc, copper and combinations thereof.

11. The method of claim 7 wherein, in the step of providing the porous metal sponge-like structure formed of metal particles bound together in an interconnected form, the metal particles are selected from the group consisting of zinc, copper and combinations thereof.

12. The method of claim 11 wherein, in the step of providing the particle filter, the particle filter is a polypropylene particle filter.

13. The method of claim 11 wherein, in the step of providing the particle filter, the particle filter is a polypropylene particle filter having an average pore size of from about 5 to about 40 microns.

14. A method for treating cooling tower water to enhance the efficient operation of a cooling tower, comprising:

withdrawing cooling tower water from the cooling tower;

passing the withdrawn cooling tower water through a filter assembly to remove particulate matter and dissolved heavy metals, the filter assembly comprising:

particle filter means for removing particulate matter from the cooling tower water; and porous metal sponge-like structure means formed of metal particles bound together in an interconnected form for removing dissolved heavy metals from the cooling tower water and automatically adjusting the pH of the cooling tower water to a substantially neutral pH without chemical additives; and recirculating the cooling tower water having a substantially neutral pH and which is substantially free of particulate matter and dissolved heavy metals to the cooling tower.

15. The method of claim 14 wherein the particle filter means contains a polypropylene particle filter.

16. The method of claim 15 wherein the polypropylene particle filter has an average pore size of from about 5 to about 40 microns.

17. The method of claim 15 wherein the polypropylene particle filter has an average pore size of about 5 microns.

18. The method of claim 15 wherein the metal particles of the porous metal sponge-like structure means are zinc, copper or combinations thereof.

19. The method of claim 14 wherein the metal particles of the porous metal sponge-like structure means are zinc, copper or combinations thereof.

20. A method for treating cooling tower water containing particulate matter and dissolved heavy metals comprising:

passing the cooling tower water through a filter assembly to remove particulate matter and dissolved heavy metals and to provide treated cooling tower water having a substantially neutral pH without addition of chemical additives to the cooling tower water, wherein the filter assembly comprises:

particle filter means for removing particulate matter from the cooling tower water; and means for removing dissolved heavy metals from the cooling tower water and for adjusting the pH of the cooling tower water to a substantially neutral pH, the means for removing dissolved heavy metals from the cooling tower water and for adjusting the pH of the cooling tower water to a substantially neutral pH having at least one element comprising metal particles bound together in an interconnected form of a porous metal sponge-like structure.

21. The method of claim 20 wherein the particle filter means contains a polypropylene particle filter.

22. The method of claim 21 wherein the polypropylene particle filter has an average pore size of from about 5 to about 40 microns.

23. The method of claim 20 wherein the metal particles of the element of the means for removing dissolved heavy metals from the cooling tower water and for adjusting the pH of the cooling tower water to a substantially neutral pH are zinc, copper or combinations thereof.

24. A method for treating cooling tower water to remove particulate matter and dissolved heavy metals from the cooling tower water comprising:

passing the cooling tower water through a filter assembly to remove particulate matter and dissolved heavy metals, the filter assembly comprising:

particle filter means for removing particulate matter from the cooling tower water; and porous metal sponge-like structure means formed of metal particles bound together in an interconnected form for removing dissolved heavy metals from the cooling tower water and for providing the cooling tower water with a substantially neutral pH.

25. A method for treating cooling tower water containing particulate matter and dissolved heavy metals to provide the cooling tower water with a substantially neutral pH so at to retard bacterial growth in the cooling tower water while removing particulate matter and dissolved heavy metals from the cooling tower water, the method comprising:

passing the cooling tower water through a filter assembly, the filter assembly comprising:

particle filter means for removing particulate matter from the cooling tower water; and at least one means for removing dissolved heavy metals from the cooling tower water and for adjusting the pH of the cooling tower water to a substantially neutral pH without the addition of chemical additives, the means for removing dissolved heavy metals from the cooling tower water and for adjusting the pH of the cooling tower water to a substantially neutral pH having at least one element comprising metal particles bound together in an interconnected form of a porous metal sponge-like structure wherein the metal particles are copper particles, zinc particles or combinations thereof.

26. A method for removing dissolved heavy metal contaminants from cooling tower water and for providing the cooling tower water with a substantially neutral pH so as to retard bacterial growth in the cooling tower water, the method comprising:

passing the cooling tower water through at least one porous metal sponge-like structure comprising metal particles bound together in an interconnected form.

27. A method for removing dissolved heavy metal contaminants from cooling tower water and for providing the cooling tower water with a substantially neutral pH so at to retard bacterial growth in the cooling tower water, the method comprising:

passing the cooling tower water through at least one porous metal sponge-like structure comprising metal particles bound together in an interconnected form wherein the metal particles are copper particles.

28. A method for removing dissolved heavy metal contaminants from cooling tower water and for providing the cooling tower water with a substantially neutral pH so at to retard bacterial growth in the cooling tower water, the method comprising:

passing the cooling tower water through at least one porous metal sponge-like structure comprising metal particles bound together in an interconnected form wherein the metal particles are zinc particles.

29. A method for removing dissolved heavy metal contaminants from cooling tower water and for providing the cooling tower water with a substantially neutral pH so at to retard bacterial growth in the cooling tower water, the method comprising:

passing the cooling tower water through at least one porous metal sponge-like structure comprising metal particles bound together in an interconnected form wherein the metal particles are a combination of zinc and copper particles.

* * * * *